Jan. 27, 1942.                R. W. DE LANCEY                2,271,183
                               METERING VALVE
                            Filed July 25, 1940
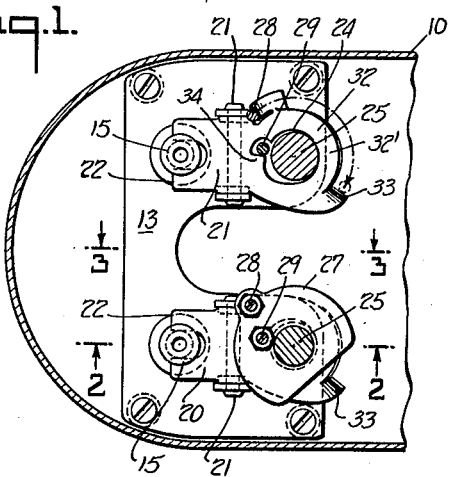
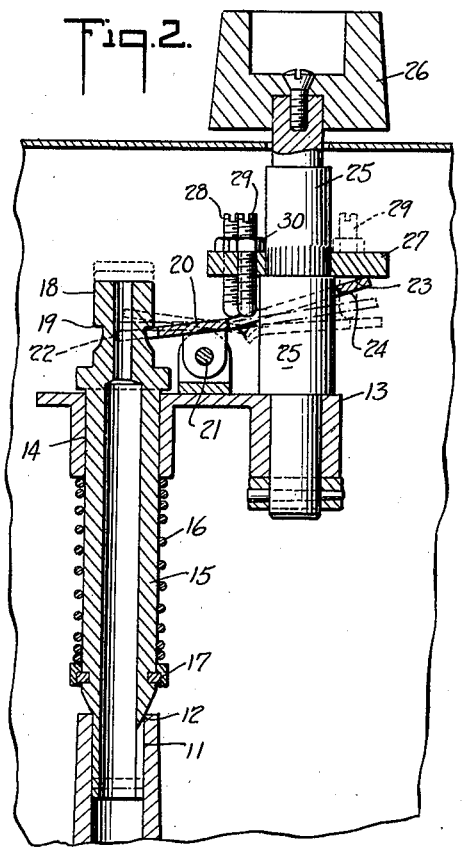
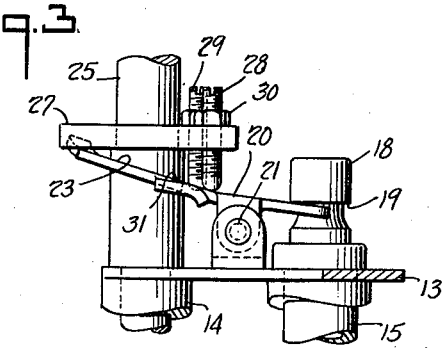
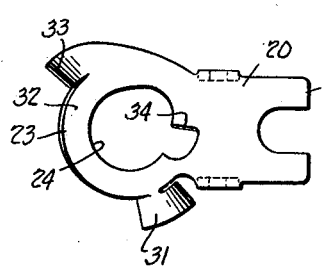
INVENTOR
RALPH W. DELANCEY
BY
ATTORNEY Patented Jan. 27, 1942

2,271,183

UNITED STATES PATENT OFFICE 2,271,183

METERING VALVE

Ralph W. De Lancey, Meriden, Conn., assignor to The Miller Company, Meriden, Conn., a corporation of Connecticut Application July 25, 1940, Serial No. 347,411

9 Claims. (Cl. 251—132)

The present invention relates to metering valves, and is more particularly directed toward metering valves designed to control the flow of fuel to oil burners of the type having a pilot supplied by oil from the chamber of a constant level valve through the same port through which the oil for the high fire is supplied.

For proper control of fuel to such burners it is desirable to have a variable feed of oil for supplying the fuel for the high fire with a definite maximum possible flow not subject to change by the user after it has once been set, and to have a definite, preset minimum flow for operating the pilot, as well as a fully closed position when the burner is to be turned off.

According to the present invention the metering valve has a valve stem spring biased toward closed position and is operated toward open position by a rockable lever pivoted adjacent the upper end of the valve stem and under the control of a shaft mounted for rotation about an axis to one side of the valve stem. All parts, except a shaft operating knob, are enclosed in a casing of the oil control valve so as to be inaccessible. The end of the lever adjacent the shaft has inclined surfaces adapted to cooperate with adjustable screws eccentrically carried by the shaft so that by turning the shaft the adjacent end of the lever may be shifted to move the other end of the lever and move the valve stem off its seat.

According to the present invention one such adjustable screw is used to control the pilot opening and the other is used to control the maximum opening for high fire, together with intermediate openings.

The accompanying drawing shows, for purposes of illustrating the present invention, one of the many embodiments in which the invention may take form, it being understood that the drawing is illustrative of the invention rather than limiting the same.

In the drawing:

Figure 1 is a top plan view through a fuel feed control having two metering valves, parts being broken away in one of these valves;

Figure 2 is a sectional view on the line 2—2 of Figure 1 showing the valve fully closed in full line position and fully open in the dot-and-dash line position;

Figure 3 is a sectional view taken on the line 3—3 of Figure 1 with parts in elevation; and Figure 4 is a top plan view of the rocking lever.

The chamber for an oil control valve is indicated at 10. It has an outlet port 11 provided with a valve seat 12. These are usually in duplicate. A bridge 13 is carried across the upper part of the chamber 10. This bridge has vertical guides 14 for valve stems indicated at 15, so that two burners may be supplied from one constant level valve. Each stem extends down into the outlet port, as indicated, and is urged downwardly by a coiled spring, such as indicated at 16, bearing on a washer 17 carried by the valve stem.

The upper end of each valve stem has a head indicated at 18 and a shoulder indicated at 19. Rockable levers 20 are pivoted to move about axes indicated at 21, 21. Each lever has a bifurcated end 22 which enters under the shoulder 19 of the corresponding valve stem 15. The opposite ends of the levers 20 extend obliquely, as indicated at 23, and each is apertured, as indicated at 24, to receive a shaft 25. The shaft is secured in the bridge 13 for rotation about its vertical axis and has a turning knob 26 at the top.

The disk 27 is forced on to the shaft 25, and this disk has two tapped holes to receive screws 28 and 29, each provided with a lock nut indicated at 30. The outer screw 28 engages a short inclined surface 31 formed on inclined end 23 of the lever 20 and is arranged to obtain the small pilot opening of the valve stem when the shaft 25 is given a predetermined movement away from the off position. The inner screw 29 is designed to engage an arcuate inclined surface 32 which extends through substantially 180 degrees, as indicated by the curved arrow 32' at the top. This screw will engage the inclined surface of the lever before the screw 28 passes beyond the short inclined surface 31 so that there will be a continued opening of the valve as the shaft is turned in the clockwise direction, as indicated in Figure 1. After pilot control screw 28 passes beyond the cooperative surface 31 it travels about until it engages a stop indicated at 33, thereby definitely limiting the angular movement of the shaft 25 toward valve opening position. When the burner is to be turned completely off the shaft 25 is turned back and will bring the screw 29 against a stop 34 formed in the lever 20. At this time the screw 29 will have passed clear of the surface 31 so that the spring 16 can securely close the valve.

The construction herein shown is susceptible of easy manufacture and assembly. The lever 20 can be stamped in dies and given the proper configuration. High flame and pilot flame adjustments can readily be made by the screws 29 and 28, respectively. After the screws are adjusted and locked in place each becomes an arm of fixed dimension swinging about the shaft axis. The control valve is normally covered and when the cover is in place and sealed it is impossible for one to tamper with the metering valve settings. It can be operated only by turning the knob, and there is no possibility of pulling the valve stem up to flood the burner. The device employs small parts so that compact assembly is possible.

It is obvious that the invention may be embodied in many forms and constructions within the scope of the claims and I wish it to be understood that the particular form shown is but one of the many forms. Various modifications and changes being possible, I do not otherwise limit myself in any way with respect thereto.

What is claimed is:

1. A metering valve comprising a valve seat, a reciprocable valve stem, a spring biasing the stem toward closed position, an operating shaft adjacent the valve stem and mounted for movement about the shaft axis only, a rockable lever extending in a generally radial direction from the stem and pivoted on a horizontal axis located between the stem and shaft and having one end in engagement with the valve stem to move it against the spring and hold it in variable open positions, the other end of the lever having a surface inclined with respect to the shaft axis when the valve stem is seated, and an arm carried by the shaft and engageable with the inclined surface of the lever during the turning of the shaft whereby the valve stem may be shifted to various open positions, the arm contacting the inclined surface at greater distances from the axis of the lever and from the valve stem as the valve is opened wider whereby the leverage ratio varies.

2. A valve such as claimed in claim 1, wherein the arm includes a screw adapted to contact the inclined surface and adjustable in directions parallel with the shaft axis.

3. A metering valve comprising a valve seat, a reciprocable valve stem, a spring biasing the stem toward closed position, an operating shaft adjacent the valve stem and mounted for movement about the shaft axis only, a rockable lever pivoted between the stem and shaft and having one end in engagement with the valve stem to move it against the spring and hold it in variable open positions, the other end of the lever having surfaces inclined with respect to the shaft axis when the valve stem is seated, and two arms carried by the shaft, each engageable with one of the inclined surfaces of the lever during the turning of the shaft whereby the valve stem may be shifted to various open positions, one arm cooperating with one surface of the lever to control valve stem movements of small amount when the valve stem is slightly opened, the other arm cooperating with the other surface of the lever to control valve stem movements for wider openings.

4. A valve such as claimed in claim 3, wherein the lever has stops each engageable with an arm on the shaft to limit the turning of the shaft.

5. In combination, a support, a shaft rotatably carried by the support, a lever pivoted to the support adjacent the shaft for rocking movement about an axis at right angles to the shaft axis, a spring pressed plunger coupled to the end of the lever remote from the shaft whereby the lever is biased to rock in one direction, the end of the lever adjacent the shaft being inclined with respect to the shaft axis, the shaft carrying an eccentrically located arm bearing on the inclined end of the lever to shift the lever in the other direction as the shaft is turned, the point of contact of the arm and lever being more remote from the lever pivoted as the shaft is turned to move the plunger against the spring.

6. In combination, a support, a shaft rotatably carried by the support, a lever pivoted to the support adjacent the shaft for rocking movement about an axis at right angles to the shaft axis, a spring pressed plunger coupled to the end of the lever remote from the shaft whereby the lever is biased to rock in one direction, the end of the lever adjacent the shaft having two surfaces concentric with the shaft axis and inclined relative to said shaft axis, the shaft carrying two eccentrically located arms, one cooperable with the large diameter surface to control small movements of the plunger away from its normal position, the other arm cooperating with the small diameter surface to control larger movements of the plunger.

7. In a valve, a vertically reciprocable valve stem, a valve seat, a spring urging the stem toward the seat, a lever extending laterally from the top of the valve stem and rockable about a horizontal axis to raise the valve stem against the spring, the other end of the lever being apertured and extending obliquely upwardly to provide an arcuate inclined surface extending substantially 180° about the aperture axis, a rotatably mounted shaft extending through said aperture, and an eccentrically located arm carried by the shaft and engageable with the inclined surface of the lever to swing the lever as the shaft is turned.

8. A valve such as claimed in claim 7, wherein the lever has a second inclined surface of short angular extent at a larger radius than the first and the shaft has a second eccentrically located arm cooperable with the second inclined surface to swing the lever through a short distance and open the valve a small amount before the first arm engages the lever.

9. In a valve, a vertically reciprocable valve stem, a valve seat, a spring urging the stem toward the seat, a lever extending laterally from the top of the valve stem and rockable about a horizontal axis to raise the valve stem against the spring, the other end of the lever being apertured and extending obliquely upwardly to provide a long arcuate inclined surface at a small radius and a short inclined surface at a greater radius, a rotatably mounted shaft having two longitudinally adjustable eccentrically located screws, one adapted to bear on the outer inclined surface to give the valve stem a controlled short movement away from its seat as the shaft is turned to open the valve, the other screw bearing on the longer inclined surface to give the valve a controlled further movement as the shaft is rotated further in the valve opening direction.

RALPH W. DE LANCEY.